United States Patent [19]

Ukihashi et al.

[11] 4,277,586

[45] Jul. 7, 1981

[54] PROCESS FOR PREPARING A PROPYLENE-TETRAFLUOROETHYLENE COPOLYMER

[75] Inventors: Hiroshi Ukihashi, Tokyo; Masaaki Yamabe, Machida; Hiroaki Kojima, Yokohama, all of Japan

[73] Assignee: Asahi Glass Company, Ltd., Tokyo, Japan

[21] Appl. No.: 763,136

[22] Filed: Jan. 27, 1977

Related U.S. Application Data

[63] Continuation of Ser. No. 525,648, Nov. 20, 1974, abandoned.

[51] Int. Cl.$^3$ .................. C08F 2/26; C08F 214/26
[52] U.S. Cl. ................................ 526/93; 204/159.2; 260/29.6 F; 260/42.27; 526/255
[58] Field of Search .............................. 526/93, 255; 260/29.6 F

[56] References Cited

U.S. PATENT DOCUMENTS

| | | | |
|---|---|---|---|
| 2,720,510 | 10/1955 | Rothlisberger | 526/94 |
| 3,467,635 | 9/1969 | Brasen | 526/255 |
| 3,560,466 | 2/1971 | Bjornson | 526/94 X |
| 3,654,245 | 4/1972 | Kometani | 526/93 X |
| 3,726,483 | 4/1973 | Kometani | 526/93 X |
| 3,825,510 | 7/1974 | Yamamoto | 526/255 X |
| 3,892,641 | 7/1975 | Tabata | 526/255 X |

*Primary Examiner*—C. A. Henderson
*Attorney, Agent, or Firm*—Oblon, Fisher, Spivak, McClelland & Maier

[57] ABSTRACT

Propylene and tetrafluoroethylene are copolymerized at the low temperature of 0°–50° C. in an aqueous medium in the presence of a specific redox catalyst system. The specific redox catalyst system comprises (1) a water soluble inorganic persulfate, (2) a water soluble thiosulfate or bisulfite and (3) a water soluble iron salt, and preferably further comprises a reducing sugar and a water soluble pyrophosphate. The propylene-tetrafluoroethylene copolymer having high molecular weight and low Mooney viscosity can be prepared at high copolymerization reaction rates.

9 Claims, No Drawings

PROCESS FOR PREPARING A PROPYLENE-TETRAFLUOROETHYLENE COPOLYMER

This is a continuation of application Ser. No. 525,648, filed Nov. 20, 1974, now abandoned.

BACKGROUND OF THE INVENTION

1. Field of the Invention

The present invention relates to a process for preparing a propylene-tetrafluoroethylene copolymer having high molecular weight. More particularly, it relates to a process for preparing a propylene-tetrafluoroethylene copolymer having high molecular weight and low Mooney viscosity by copolymerizing propylene and tetrafluoroethylene at low temperature in an aqueous medium in the presence of a specific redox catalyst system.

2. Description of the Prior Art

Heretofore, various processes for preparing copolymers of a fluoroolefin, e.g., tetrafluoroethylene, trifluorochloroethylene, hexafluoropropylene, vinylidenefluoride or vinylfluoride and an olefin, e.g., ethylene, propylene or isobutylene, have been proposed.

These copolymerization reactions in aqueous media have been disclosed in Japanese Patent Publication No. 19188/1965 and U.S. Pat. No. 3,467,635. It has also been known that propylene-tetrafluoroethylene copolymers are vulcanizable elastomers having both high heat and chemical resistance. However, the propylene-tetrafluoroethylene copolymers prepared by the conventional processes are characterized by low molecular weight and it is difficult to provide satisfactory vulcanizates of sufficient tensile strength and compression set. Conventional emulsion copolymerizations of propylene and tetrafluoroethylene at 60°–70° C. in a redox catalyst system comprising ammonium persulfate and sodium bisulfite yield copolymers having a number average molecular weight of only about 50,000–80,000. These low molecular weight copolymers have a high Mooney viscosity (about 150–200). Blending and molding of the copolymers in the vulcanization has been difficult resulting in a high compression set of the vulcanizates. The copolymers are therefore not suitable as a raw material for rubbers.

It has also been known that copolymers having high molecular weight can be prepared by the use of high energy ionizing radiation, in a γ-ray initiated emulsion copolymerization at ambient temperature. In the conventional catalytic emulsion copolymerization, the copolymerization reaction rate (hereafter referred to as the reaction velocity) is quite slow at low temperatures, particularly lower than 50° C. This is therefore not satisfactory for industrial operation. It is significant to note that the copolymerization reaction of propylene and tetrafluoroethylene has never been accomplished at temperatures lower than 50° C. in an aqueous medium using a conventional catalyst system. When a conventional catalyst system is used, the resulting copolymer is difficult to disperse in an aqueous medium, to form a stable dispersion, and the resulting copolymer is easily blocked.

SUMMARY OF THE INVENTION

Accordingly, it is one object of the present invention to provide a process for preparing a propylene-tetrafluoroethylene copolymer having high molecular weight and low Mooney viscosity, at high copolymerization reaction velocity.

It is another object of the invention to provide a process for copolymerizing propylene and tetrafluoroethylene in an aqueous medium whereby the copolymerization reaction velocity or reaction rate is quite high even at low temperatures.

It is another object of the invention to provide a catalytic aqueous copolymerization to give a propylene-tetrafluoroethylene copolymer in the form of a stable dispersion.

These and other objects of this invention, as will hereinafter become more readily apparent, have been attained by a process whereby a propylene-tetrafluoroethylene copolymer is prepared which provides a vulcanizate of low compression set and high tensile strength, which comprises copolymerizing propylene and tetrafluoroethylene in an aqueous medium at 9°–50° C. in the presence of a redox catalyst system comprising (1) a water soluble inorganic persulfate, (2) a water soluble thiosulfate or bisulfite and (3) a water soluble iron salt.

DETAILED DESCRIPTION OF THE PREFERRED EMBODIMENTS

In accordance with this invention, it is possible to easily prepare a propylene-tetrafluoroethylene copolymer having molecular weights as high as 100,000 or higher, which has not heretofore been possible by conventional procedures when the reaction is effected in an aqueous medium. Moreover, even though the reaction is performed at temperatures as low or lower than 50° C., a copolymerization reaction velocity which is most suitable for industrial operation can be attained. Moreover, in accordance with the process of this invention, latex selectivity can be about 100% in the emulsion copolymerization, and the propylene-tetrafluoroethylene copolymers can be prepared in the form of stable dispersions.

The propylene-tetrafluoroethylene copolymer prepared in accordance with the process of this invention has a low Mooney viscosity, although the molecular weight can be high. Thus, vulcanizates can be attained which are characterized by high tensile strengths and low compression sets.

In the process of this invention, the molar ratio of tetrafluoroethylene to propylene $C_2F_4/C_3H_6$ in the reaction system is not particularly critical, but varies over a very wide range. Good results are usually attained within the range of 95/5–20/80 during the reaction. It is preferable to use an excess amount of $C_2F_4$ in the reaction system to improve the copolymerization reaction velocity. In this manner, copolymers having high molecular weights and low Mooney viscosities can be advantageously prepared.

The preferred molar ratio of $C_2F_4/C_3H_6$ in the reaction system is 90/10–70/30. In order to maintain this molar ratio of $C_2F_4/C_3H_6$, it is preferable that the $C_2H_4/C_3H_6$ reactants be charged into the reaction system in amounts which correspond to the amounts intended to be reacted. Other comonomers can also be included in the copolymerization reaction and by varying the molar ratio of $C_2F_4$ to $C_3H_6$ or the molar ratio of the additional comonomer to total gases, products of a range of properties are attainable.

In the specific redox catalyst system used in the process of this invention, the first component of the water soluble inorganic persulfate can be an ammonium salt or alkali metal salt, such as ammonium persulfate, potassium persulfate, sodium persulfate or the like. Ammonium persulfate is most preferred. The second component is a water soluble thiosulfate or bisulfite, which suitably can be an ammonium salt or alkali metal salt, such as sodium thiosulfate, potassium thiosulfate, ammonium thiosulfate, potassium bisulfite, sodium bisulfite, ammonium bisulfite, or the like. The thiosulfate is preferably used in the process of this invention since thiosulfate seems to impart a higher effect in the improvement of the copolymerization reaction velocity than the bisulfite.

The third component is a water soluble iron salt which suitably can be a divalent or trivalent iron salt such as ferrous sulfate, ferric sulfate, ferrous nitrate, ferric nitrate, ferrous chloride, ferric chloride, ammonium ferrous sulfate, ammonium ferric sulfate, or the like.

If the second component is replaced with a dithionite, such as sodium dithionite, the copolymerization reaction will not occur. If the third component is replaced with cupric sulfate, cobaltous sulfate or tetraethylene pentamine, the copolymerization reaction will not occur.

The molar ratio of components of the specific redox catalyst system, (persulfate)/(thiosulfate or bisulfite)/(iron salt) is preferably (0.1–2.0)/(1.0)/(0.005–0.5) preferably (0.5–1.5)/(1.0)/(0.01–0.3). The quantity of redox catalyst used is preferably 0.001–5 wt%, preferably 0.01–2 wt % in the aqueous medium. It is possible to increase the quantity of redox catalyst system beyond that range, however, the molecular weight of the resulting copolymer will be decreased with various economical disadvantages.

It is possible to improve the copolymerization reaction velocity by the addition of an iron salt in the form of an activator solution of a water soluble pyrophosphate, and a reducing sugar together with the iron salt.

Suitable water soluble pyrophosphates are the ammonium salts or alkali metal salts, such as sodium pyrophosphate, potassium pyrophosphate, ammonium pyrophosphate, etc. It is preferable to use sodium pyrophosphate. The reducing sugar can be dextrose, fructose, glucose, sorbose, etc. It is preferable to use fructose. The activator solution can be prepared by mixing the pyrophosphate, the iron salt and reducing sugar, in that order, in a nitrogen atmosphere and then heating the mixture while stirring at 60°–100° C. for 15–60 minutes and thereafter cooling to ambient temperature. The activation effect cannot be attained by the addition of only a pyrophosphate or a reducing sugar. Sometimes, the copolymerization reaction velocity will be decreased by the addition of only a single component. The amount of the pyrophosphate and the amount of the reducing sugar in the activator solution can respectively be 0.1–20 mole, preferably 0.5–20 mole to 1 mole of the persulfate in the specific redox catalyst system.

It is preferable to prepare the specific redox catalyst system in the presence of a monomer mixture of tetrafluoroethylene and propylene from the viewpoint of the catalytic activity. For example, the inorganic persulfate and thiosulfate may be admixed together in the presence of $C_2F_4$ and $C_3H_6$ in an aqueous medium. The mixture should then be kept at the reaction temperature while stirring while the activator solution, composed of an iron salt, pyrophosphate, and a reducing sugar, is added.

The copolymerization reaction of the invention is performed at 0°–50° C. When the reaction temperature is above 50° C., the molecular weight of the copolymer will be decreased and the Mooney viscosity of the copolymer will be increased. When higher reaction temperatures are used, the dispersing condition of the resulting copolymer in the aqueous medium can be prevented. The copolymer prepared by the reaction at above 50° C. gives vulcanizates having low tensile strength and high compression set. When the reaction temperature is too low, the copolymerization reaction velocity will be too slow for all practical purposes. The optimum reaction temperature is in the range of 10°–45° C. and especially 20°–40° C. The copolymerization reaction can be performed by selecting suitable conditions such as a desirable stirring condition, a batch system, or a continuous operation. The pressure in the copolymerization reaction is not critical and is usually lower than 100 kg/cm$^2$ (gauge) especially 10–80 kg/cm$^2$ (gauge). Usually, the Mooney viscosity of the resulting copolymer will increase as the molecular weight increases. In the copolymerization system of the invention, the molecular weight of the copolymer will increase as the reaction temperature decreases, however, the Mooney viscosity of the copolymer will also decrease. For example, a copolymer prepared at 25° C. and a reaction temperature of 25° C. will have twice the molecular weight of that of a copolymer prepared at 70° C. However, the former copolymer will have a lower Mooney viscosity, as compared to the latter copolymer.

In accordance with this invention, it is possible to effectively prepare a copolymer having a high molecular weight and a low Mooney viscosity.

Various additives may be used in the copolymerization reaction aqueous medium. For example, it is possible to add an emulsifier, as is commonly used for emulsion polymerizations, such as polyfluoro- or polyfluorochloro-alkyl type emulsifiers for instance, polyfluorocarboxylic acids, water soluble salts of perfluorocarboxylic acids, water soluble salts of polyfluorochlorocarboxylic acids or perfluorochloro-carboxylic acids and phosphates or sulfates of polyfluoroalcohols. Other emulsifiers suitable for emulsifying propylene such as sulfates of higher aliphatic alcohols or water soluble salts of aromatic sulfonic acids may also be used. A mixture of the emulsifiers can be used. When an emulsifier is used, amounts of from 0.0001–10 wt %, preferably 0.001–5 wt % are suitable. Dispersion stabilizers may be added, such as trifluorotrichloroethane, liquid chlorinated hydrocarbons, liquid saturated hydrocarbons, etc.; or a pH adjusting agent; a buffer agent or an accelerator to achieve specific reaction rates.

It is preferable to perform the copolymerization reaction in a weak alkaline or neutral condition (pH about 7.0–11.0) from the viewpoint of the copolymerization reaction velocity, and accordingly, it is preferable to add a pH adjusting agent such as sodium hydroxide, potassium hydroxide, ammonium hydroxide, sodium hydrogen phosphate, to the reaction medium. In order to promote the copolymerization reaction velocity, it is possible to add a water miscible organic solvent such as methanol, t-butanol, acetone or the like.

The propylene-tetrafluoroethylene copolymer is obtained in a form of an aqueous dispersion, such as a suspension or an emulsion, in which the copolymer is dispersed in an aqueous medium. The propylene-tetrafluoroethylene copolymer having rubber-like elasticity is then separated from the aqueous dispersion by coagulation using well-known techniques. The copolymer can be used in molding operations by concentrating the aqueous dispersion to a desirable concentration. The propylene-tetrafluoroethylene copolymer prepared by the process of this invention will have a high molecular weight (80,000–300,000, preferably 120,000–200,000) and a low Mooney viscosity (40–150, preferably 60–100) and also will have excellent electrical characteristics, chemical resistance, heat resistance and mechanical properties, so that whereby the copolymer is particularly well adapted for a wide variety of applications.

The propylene-tetrafluoroethylene copolymer of the invention can be cross-linked with a cross-linking agent, e.g., a peroxy compound and heat. Other operable cross-linking agents include the organic monoperoxy compounds such as: cumene hydroperoxide, diisopropylbenzene hydroperoxide, di(t-butyl)peroxide, dicumylperoxide, t-butylperoxyacetate, and t-butylperoxybenzoate; organic diperoxy compounds such as 2,5-dimethyl-2,5-di(t-butylperoxy)-hexene-3, 2,5-dimethyl-2,5-di(t-butylperoxy)-hexane, $\alpha,\alpha'$-bis(t-butylperoxy)-p-diisopropylbenzene, and 2,5-dimethyl-2,5-di(benzoylperoxy)-hexane. The cross linking agents which have 5 minutes of half life period at 100°–200° C., preferably 130°–190° C., are especially preferable. Suitable amounts of cross-linking agents are preferably 0.1–20 wt parts and most preferably 1–10 wt parts to 100 wt parts of the propylene-tetrafluoroethylene copolymer. The propylene-tetrafluoroethylene copolymer can be cross-linked with high energy ionizing radiation, such as $\alpha$-rays, $\beta$-rays, $\gamma$-rays, neutron rays, accelerating particle rays, X-rays or an electron beam. It is preferable to irradiate with $\gamma$-rays from a cobalt-60 source or with accelerating particle rays, electron beams, etc. from a cobalt-60 source. For example, the propylene-tetrafluoroethylene copolymer can be cross-linked with high energy ionizing radiation at a dose rate in the range of $10^2-10^9$ roentgens/hour, preferably $10^3-5\times10^7$ roentgens/hour and the total dose of $10^4-10^8$ rads especially $10^6-5\times10^7$ rads. The high energy ionizing radiation can be applied in air, or in vaccuo, in an inert gas atmosphere, such as argon, helium, nitrogen or in water. The cross linking reaction by the high energy ionizing radiation can be performed in high efficiency at room temperature or the like and accordingly, it is necessary to limit the radiation temperature, which can be lower than room temperature or 100° C. or above.

In the cross-linking reaction of the propylene-tetrafluoroethylene copolymer, it is possible to add a cross-linking promoter such as allyl compounds, sulfun, organic amines, maleimides, methacrylates, divinyl compounds, oxime compounds, etc. Suitable organic allyl compounds include diallyl phthalate, triallyl phosphate, triallyl cyanurate, triallyl isocyanurate, diallyl melamine; oximes such as p-benzoquinone dioxime, p,p'-dibenzoyl benzoquinone dioxime, or the like. The organic allyl compounds are especially preferable. When a cross-linking promoter is used, good results are attained when amounts of 0.1–20 wt parts, preferably 0.2–10 wt parts to 100 wt parts of the propylene-tetrafluoroethylene copolymer are used. Various promoters can be used in the cross linking reaction, such as metal oxides, e.g., magnesium oxide, lead oxide, reinforcing fillers, e.g., carbon black, fine silica, other fillers, pigments; antioxidants or stabilizers.

In carrying out this reaction, it is preferable to admix the copolymer with the cross-linking agent, and, if necessary, the promoter, and any other additives in a roller mill, such as is commonly used for kneading rubber, a Bambury mixer, or the like. The conditions of mixing are not specifically critical, and the cross-linking agent and other additives can be completely dispersed into the copolymer by kneading at about 30°–80° C. for about 10–60 minutes. The conditions of the mixing operation can be readily determined depending upon the specific materials and the end purposes of the product. The mixture is then heated to effect cross-linking. The heating operation can be accomplished in a mold under pressure, by a molding operation by extrusion or by injection molding and heating. The specific heating conditions will be determined by the particular materials etc., but usually is about 80°–250° C., preferably 150°–200° C. The heating period for effecting adequate cross-linking is usually more than 20 minutes, and preferably 0.5–2 hours. In general, the higher the temperature, the shorter will be the required heating period.

The mechanical strength of the resulting cross-linked copolymer can be further increased by re-heating or re-curing. For example, the tensile strength of the cross-linked copolymer can be effectively increased by re-heating the once cross-linked copolymer at 150°–250° C., and preferably 180°–230° C. for 15–25 hours.

A further understanding can be obtained by reference to certain specific examples, which are included for purposes of illustration only and are not intended to be limiting unless otherwise specified.

EXAMPLE 1

In a 1 liter stainless steel autoclave (50 kg/cm$^2$ compressive strength) equipped with a stirrer and a hot water bath, 700 g of dioxidized water (ion exchanged), 3.5 g of ammonium perfluoroctanate, 1.75 g of ammonium persulfate and 1.75 g of sodium thiosulfate were charged. 1.0 g of sodium hydroxide was then added to the mixture to adjust to pH 9. The reactor was purged with nitrogen and was cooled at 0° C., and then a mixture gas of tetrafluoroethylene and propylene (molar ratio of 75/25 of $C_2F_4/C_3H_6$) was introduced to give a pressure of 16 kg/cm$^2$. The reactor was heated to 40° C. while stirring so as to give a pressure of 30 kg/cm$^2$ and then an activator solution comprising 0.5 g of ferrous sulfate, 5.0 g of sodium pyrophosphate and 5.0 g of fructose was added, whereby the pressure began to decrease after about 20 minutes, and accordingly, the mixture gas of tetrafluoroethylene and propylene (molar ratio of 50/50 of $C_2F_4/C_3H_6$) was further introduced to maintain the pressure at 29–30 kg/cm$^2$ for 15 hours. The reactor was cooled and the residual monomer was discharged and the emulsion in the reactor was frozen to coagulate the copolymer. The product was washed with water and dried to give 75 g of white rubber-like copolymer. The copolymer production velocity was 7 g/l.hr. and the number average molecular weight of the copolymer was 110,000 (osmotic pressure). The copolymer contained 52 mole % of tetrafluoroethylene, and had a Mooney viscosity (ML$_{1+10}$, 100° C.) of about 110, and a decomposition temperature of 412° C. In the copolymerization reaction, the reaction was performed in a complete dispersing condition without formation of the copolymer block. Accordingly, the selectivity to the emulsion was 100%.

EXAMPLES 2–5 AND REFERENCES 1–8

In a 1 liter stainless steel autoclave, 700 g of deoxidized water (ion exchanged), 3.5 g of ammonium perfluoroctanate, and 1.75 g of ammonium persulfate were charged and sodium hydroxide was added to adjust to pH 9-10. The various additives shown in Table 1 were also added. The reactor was purged with nitrogen and a mixture gas of tetrafluoroethylene and propylene (molar ratio of 75/25 of $C_2F_4/C_3H_6$) was introduced to give a pressure of 30 kg/cm$^2$ at 40° C. The copolymerization reaction was performed at 40° C. for 15 hours while stirring. The results are shown in Table 1. In Table 1, the copolymerization reaction velocity and number average molecular weight measured by membrane osmometry are shown.

TABLE 1

|  | Additive (g) | Reaction velocity (g/l. hr.) | Molecular weight |
|---|---|---|---|
| Example 2 | $Na_2S_2O_3$-$FeSO_4$ (1.75) (0.35) | 2.4 | 80,000 |
| Example 3 | $Na_2S_2O_3$-$FeSO_4$-fructose (1.75) (0.35) (3.5) | 3.0 | 100,000 |
| Example 4 | $Na_2S_2O_3$-$FeSO_4$-fructose-$Na_4P_2O_7$ (1.75) (0.18) (1.75) (1.75) | 6.1 | 95,000 |
| Example 5 | $NaHSO_3$-$FeSO_4$-fructose-$Na_4P_2O_7$ (1.75) (0.18) (1.75) (1.75) | 4.9 | 95,000 |
| Reference 1 | $FeSO_4$ (0.18) | 0 | — |
| Reference 2 | $Na_2S_2O_3$ (1.75) | 0 | — |
| Reference 3 | $NaHSO_3$ (1.75) | 0 | — |
| Reference 4 | $Na_2S_2O_3$-$CuSO_4$ (1.75) (0.18) | 0 | — |
| Reference 5 | $Na_2S_2O_3$-$CoSO_4$ (1.75) (0.18) | 0 | — |
| Reference 6 | $Na_2S_2O_3$-tetraethylenepentamine (1.75) (0.18) | 0 | — |
| Reference 7 | $FeSO_4$-fructose-$Na_4P_2O_7$ (0.18) (1.75) (1.75) | 0 | — |
| Reference 8 | $Na_2S_2O_4$-$FeSO_4$-fructose-$Na_4P_2O_7$ (1.75) (0.18) (1.75) (1.75) | 0 | — |

EXAMPLES 6-10

In a 10 liter stainless steel autoclave, 4050 g of deoxidized water (ion-exchanged), 29 g of ammonium perfluoroctanate ($C_7F_{15}COONH_4$), 15 g of ammonium persulfate, 15 g of sodium thiosulfate and 690 g of t-butanol were charged, and sodium hydroxide was added to pH 9. A mixture gas of tetrafluoroethylene and propylene (molar ratio of 85/15 of $C_2F_4/C_3H_6$) was charged in accordance with the process of Example 1. 1120 g of an activator solution comprising 2.9 g of ferrous sulfate, 29 g of sodium pyrophosphate and 29 g of fructose was added to the reactor, to initiate the reaction. The reaction temperature was kept as shown in Table 2, and the mixture gas of tetrafluoroethylene and propylene (molar ratio of 55/45 of $C_2F_4/C_3H_6$) was continuously introduced to maintain a pressure of 25 kg/cm$^2$ for 25 hours. The results of the copolymerization, reaction velocity, the number average molecular weight and the Mooney viscosity of the copolymers are shown in Table 2.

TABLE 2

|  | Reaction temperature (°C.) | Reaction velocity (g/l.hr.) | Molecular weight | Mooney (ML$_{1+10}$, 100 C) |
|---|---|---|---|---|
| Example 6 | 45 | 17 | 90,000 | 140 |
| Example 7 | 40 | 19.8 | 120,000 | 130 |
| Example 8 | 35 | 20.5 | 150,000 | 100 |
| Example 9 | 30 | 19 | 160,000 | 95 |

TABLE 2-continued

|  | Reaction temperature (°C.) | Reaction velocity (g/l.hr.) | Molecular weight | Mooney (ML$_{1+10}$, 100 C) |
|---|---|---|---|---|
| Example 10 | 25 | 16 | 180,000 | 85 |

The Mooney viscosity was measured by ASTM D 1646 with a large rotor at 100° C. and the value after 10 minutes from 1 minute warm-up, was shown.

EXAMPLE 11

The process of Example 10 was repeated except using a 100 liter stainless steel autoclave and 10 times of all the components. After 25 hours reaction, a latex containing about 25.1 kg of the copolymer was obtained in a selectivity of 100%. The average reaction velocity was 17.3 g/l.hr. The resulting copolymer has a number average molecular weight of 182,000 and a Mooney viscosity of 85.

REFERENCE 9

In a 10 liter stainless steel autoclave, 7 kg of deoxidized water, 35 g of $C_7F_{15}COONH_4$, 17.5 g of ammonium persulfate, 4.6 g of sodium bisulfite and 140 g of $Na_2HPO_4 \cdot 12H_2O$ as the pH adjusting agent were charged, and then 49 g of propylene and 723 g of tetrafluoroethylene were introduced (molar ratio of 85/15 of $C_2F_4/C_3H_6$). The reactor was heated to 70° C. and the mixture gas was continuously added to maintain a pressure of 30 kg/cm$^2$ for 4 hours. A latex containing 1470 g of the copolymer was obtained. The copolymer has a number average molecular weight of 68,000 and a Mooney viscosity of 191.

EXAMPLE 12

The copolymer prepared by the process of Example 11 or Reference 9 blended by a 4″ roller mill and was vulcanized as shown in Table 3. The properties of the vulcanized products are also shown in this table.

| Formula | |
|---|---|
| Copolymer | 100 parts by weight |
| 2,2′-bis(t-butylperoxy)-p-diisopropyl benzene | 5 |
| triallylisocyanurate | 3 |
| magnesium oxide | 10 |
| carbon black (MT) | 25 |
| Vulcanization | |
| Press vulcanization | 150° C.   40 mins. |
| Oven vulcanization | 200° C.   20 hours. |

TABLE 3

|  | Example 11 copolymer | Reference 9 copolymer |
|---|---|---|
| Tensile strength kg/cm$^2$ | 240 | 170 |
| Elongation (%) | 400 | 314 |
| Tensile modulus at 100% kg/cm$^2$ | 35 | 63 |
| Hardness Shore A | 73 | 87 |
| Elongation set (%) | 5 | 9 |
| Compression set (%) (200° C. 22 hours) | 40 | 86 |

EXAMPLE 13

The process of Example 10 was repeated except introducing by compression a mixture of gas of tetrafluoroethylene, propylene and ethylene (molar ratio of 85/12/3 of $C_2F_4/C_3H_6/C_2H_4$). The reaction was continued at 25° C. for 21 hours under pressure of 25 kg/cm². The resulting copolymer contained 55 mole % of tetrafluoroethylene component, 41 mole % of propylene component and 4 mole % of ethylene component, had a number average molecular weight of 130,000 and a Mooney viscosity of 110.

EXAMPLE 14

The process of Example 10 was repeated except using potassium persulfate instead of ammonium persulfate and ferric chloride instead of ferrous sulfate. The reaction was continued at 25° C. under a pressure of 25 kg/cm² for 20 hours, whereby an average reaction velocity was 12 g/l. hours and a latex containing about 1.4 kg of the copolymer was obtained. The resulting copolymer contained 54 mole % of tetrafluoroethylene component and 46 mole % of propylene component, had a number average molecular weight of about 150,000 and a Mooney viscosity of 90.

EXAMPLE 15

The process of Example 1 was repeated except adding 12 wt % of t-butanol in water to carry out the copolymerization. The average reaction velocity was 15 g/l.hr. The selectivity to the emulsion was 100%. The resulting copolymer had a number average molecular weight of 108,000, and a decomposition temperature of 408° C. and a Mooney viscosity ($ML_{1+10}$, 100° C.) of 110.

EXAMPLE 16

The process of Example 10 was repeated except adding 5 wt % of acetone instead of t-butanol, to carry out the copolymerization. The average reaction velocity was 14 g/l.hr. The selectivity to the emulsion was 100%. The resulting copolymer had a number average molecular weight of 140,000, a decomposition temperature of 415° C. and Mooney viscosity ($ML_{1+10}$, 100° C.) of 90.

REFERENCE 10

The process of Example 1 was repeated except adding 1.75 g of diisopropyl peroxydicarbonate instead of ammonium persulfate, sodium thiosulfate as the activator solution. As a result, the average reaction velocity was 6 g/l.hr., however, the resulting copolymer was precipitated in block form and was not in emulsion form. The average molecular weight of the copolymer was 35,000.

REFERENCE 11

The process of Reference 10 was repeated except adding 1.75 g of diisobutyl peroxide instead of diisopropyl peroxy dicarbonate. As a result, the average reaction velocity was 8 g/l.hr. and the selectivity to the emulsion was 100%. The resulting copolymer had a number average molecular weight of 55,000 and a decomposition temperature of 360° C.

REFERENCE 12

The process of Reference 10 was repeated except using a catalyst system of 0.90 g of cumene hydroperoxide, 1.75 g of sodium bisulfite and the activator solution of Example 1 instead of the peroxydicarbonate. As the result, the average reaction velocity was 2 g./l.hr. The selectivity to the emulsion was 98% and the molecular weight of the copolymer was 60,000.

REFERENCE 13

The process of Reference 10 was repeated except using a catalyst system of 1.75 g of disuccinic acid peroxide, 1.75 g of sodium bisulfite and the activator solution of Example 1. As a result, no polymerization was effected.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a process for the preparation of a stable dispersion of a propylene and tetrafluoroethylene copolymer of molecular weight 80,000–300,000 and a Mooney viscosity ($ML_{1+10}$, 100° C.) of 40–150 in which propylene and tetrafluoroethylene are copolymerized while dispersed in an aqueous medium, the improvement which comprises:
copolymerizing said propylene and tetrafluoroethylene at 10°–45° C. in the presence of a catalyst system comprising (1) a water soluble inorganic persulfate, (2) a water soluble thiosulfate or bisulfite and (3) a water soluble iron salt, the molar ratio of said water soluble inorganic persulfate/water soluble thiosulfate or bisulfite/water soluble iron salt being 0.1–2.0/1.0/0.005–0.5.

2. The process according to claim 1, wherein the molar ratio of tetrafluoroethylene to propylene in the reaction system is 90/10–70/30.

3. The process according to claim 1, wherein a comonomer is added to the mixture gas of propylene and tetrafluoroethylene.

4. The process according to claim 1, wherein 0.001–5 wt % catalyst system is added to the aqueous medium.

5. The process according to claim 1, wherein said iron salt is combined with a pyrophosphate and a reducing sugar.

6. The process according to claim 1, wherein the copolymerization reaction is performed under a pressure of lower than 100 kg/cm² (gauge).

7. The process according to claim 1, wherein the copolymerization reaction is performed at pH 7.0–11.0.

8. The process according to claim 1, wherein copolymerization reaction is performed in the presence of a water miscible organic solvent.

9. The process according to claim 5, wherein the molar ratio of pyrophosphate/persulfate is 0.1–20/1 and the molar ratio of the reducing sugar/persulfate is 0.1–20/1, and the pyrophosphate and the reducing sugar are combined in a solution of the iron salt before mixing with the persulfate.

* * * * *